United States Patent
Kim et al.

(10) Patent No.: US 10,660,120 B2
(45) Date of Patent: May 19, 2020

(54) DOWNLINK SIGNAL RECEPTION METHOD AND USER EQUIPMENT, AND DOWNLINK SIGNAL TRANSMISSION METHOD AND BASE STATION

(71) Applicant: LG ELECTRONICS INC., Seoul (KR)

(72) Inventors: Eunsun Kim, Seoul (KR); Kijun Kim, Seoul (KR); Suckchel Yang, Seoul (KR); Hyunsoo Ko, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 10 days.

(21) Appl. No.: 16/099,669

(22) PCT Filed: May 11, 2017

(86) PCT No.: PCT/KR2017/004897
§ 371 (c)(1),
(2) Date: Nov. 7, 2018

(87) PCT Pub. No.: WO2017/196108
PCT Pub. Date: Nov. 16, 2017

(65) Prior Publication Data
US 2019/0159230 A1 May 23, 2019

Related U.S. Application Data

(60) Provisional application No. 62/335,031, filed on May 11, 2016.

(51) Int. Cl.
*H04W 72/12* (2009.01)
*H04L 5/00* (2006.01)

(52) U.S. Cl.
CPC ....... *H04W 72/1268* (2013.01); *H04L 5/0053* (2013.01); *H04L 5/0082* (2013.01);
(Continued)

(58) Field of Classification Search
None
See application file for complete search history.

(56) References Cited

U.S. PATENT DOCUMENTS 9,391,737 B2 * 7/2016 Papasakellariou .... H04L 1/0045
2010/0279628 A1 * 11/2010 Love ....................... H04L 5/003
455/70

(Continued)

OTHER PUBLICATIONS

PCT International Application No. PCT/KR2017/004897, Written Opinion of the International Searching Authority dated Jul. 24, 2017, 20 pages.

(Continued)

*Primary Examiner* — Anh Ngoc M Nguyen
(74) *Attorney, Agent, or Firm* — Lee, Hong, Degerman, Kang & Waimey

(57) ABSTRACT

A control channel (CCH) is transmitted/received within a search space which is a group of CCH candidates. The CCH is transmitted/received in one of the CCH candidates. The search space spans N (N is a positive integer) time symbols among the multiple time symbols, and is configured to include a greatest number of CCH candidates in the first time symbols among the N time symbols.

12 Claims, 12 Drawing Sheets

(52) U.S. Cl.
CPC ......... *H04W 72/1289* (2013.01); *H04L 5/001* (2013.01); *H04L 5/0007* (2013.01)

(56) References Cited

U.S. PATENT DOCUMENTS

2013/0336263 A1* 12/2013 Wang ................ H04L 5/003
370/329
2015/0029910 A1 1/2015 He et al.

OTHER PUBLICATIONS

Huawei, et al., "Draft CR on search space definition for LAA DL partial subframes in 36.213", 3GPP TSG RAN WG1 Meeting #84, R1-162135, Apr. 2016, 3 pages.
Zte, et al., "WF on start subframe of NB-PDDCH search space", 3GPP TSG RAN WG1 Meeting #84bis, R1-163570, Apr. 2016, 2 pages.
Huawei, et al., "Discussion on MPDCCH AL and search space for extended CP", 3GPP TSG RAN WG1 Meeting #84bis, R1-162613, Apr. 2016, 6 pages.

* cited by examiner

DOWNLINK SIGNAL RECEPTION METHOD AND USER EQUIPMENT, AND DOWNLINK SIGNAL TRANSMISSION METHOD AND BASE STATION

CROSS-REFERENCE TO RELATED APPLICATIONS

This application is the National Stage filing under 35 U.S.C. 371 of International Application No. PCT/KR2017/004897, filed on May 11, 2017, which claims the benefit of U.S. Provisional Application No. 62/335,031, filed on May 11, 2016, the contents of which are all hereby incorporated by reference herein in their entirety.

TECHNICAL FIELD

The present invention relates to a wireless communication system, and more particularly, to methods and devices for transmitting/receiving downlink signals.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more communication devices have demanded higher communication capacity, there has been necessity of enhanced mobile broadband (eMBB) relative to legacy radio access technology (RAT). In addition, massive machine type communication (mMTC) for providing various services at any time and anywhere by connecting a plurality of devices and objects to each other is one main issue to be considered in next generation communication.

Further, a communication system to be designed in consideration of a service/UE sensitive to reliability and standby time is under discussion. Introduction of next generation radio access technology has been discussed by taking into consideration eMBB communication, mMTC, ultra-reliable and low-latency communication (URLLC), and the like.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

In addition, a signal transmission/reception method is required in the system supporting new radio access technologies.

The technical objects that can be achieved through the present invention are not limited to what has been particularly described hereinabove and other technical objects not described herein will be more clearly understood by persons skilled in the art from the following detailed description.

Technical Solution

A CCH is transmitted/received in a search space which is a set of CCH candidates. The CCH is transmitted/received in one of the CCH candidates. The search space spans N time symbols among a plurality of time symbols, where N is a positive integer. The search space may be configured such that it includes the greatest number of CCH candidates on the first time symbol among the N time symbols.

In an aspect of the present invention, provided herein is a method of receiving a downlink signal by a user equipment. The method comprises: detecting a control channel (CCH) from one of CCH candidates by monitoring the CCH candidates in a search space which is a set of the CCH candidates of an aggregation level L (where L is a positive integer) within a time transmission interval (TTI); and receiving downlink data based on downlink control information carried by the CCH. The TTI may include a plurality of time symbols in a time domain. The search space may span N time symbols (where N is a positive integer) among the plural time symbols. Each of the CCH candidates may consists of one of the N time symbols in the time domain and L control channel elements (CCEs) in a frequency domain The search space includes a greatest number of CCH candidates on a first time symbol of the N time symbols.

In another aspect of the present invention, provided herein is a user equipment for receiving a downlink signal. The user equipment includes a radio frequency (RF) unit, and a processor configured to control the RF unit. The processor may: detect a control channel (CCH) from one of CCH candidates by monitoring the CCH candidates in a search space which is a set of the CCH candidates of an aggregation level L (where L is a positive integer) within a time transmission interval (TTI); and control the RF unit to receive downlink data based on downlink control information carried by the CCH. The TTI may include a plurality of time symbols in a time domain. The search space may span N time symbols (where N is a positive integer) among the plural time symbols. Each of the CCH candidates may consist of one of the N time symbols in the time domain and L control channel elements (CCEs) in a frequency domain. The search space may include a greatest number of CCH candidates on a first time symbol of the N time symbols.

In a further aspect of the present invention, provided herein is a method of transmitting a downlink signal by a base station. The method comprises: transmitting a control channel (CCH) using one of CCH candidates in a search space which is a set of the CCH candidates of an aggregation level L (where L is a positive integer) within a time transmission interval (TTI); and transmitting downlink data based on downlink control information carried by the CCH. The TTI may include a plurality of time symbols in a time domain. The search space may span N time symbols (where N is a positive integer) among the plural time symbols. Each of the CCH candidates may consist of one of the N time symbols in the time domain and L control channel elements (CCEs) in a frequency domain. The search space may include a greatest number of CCH candidates on a first time symbol of the N time symbols.

In a still further aspect of the present invention, provided herein is a base station for transmitting a downlink signal. The base station includes a radio frequency (RF) unit, and a processor configured to control the RF unit. The processor may: control the RF unit to transmit a control channel (CCH) using one of CCH candidates in a search space which is a set of the CCH candidates of an aggregation level L (where L is a positive integer) within a time transmission interval (TTI); and control the RF unit to transmit downlink data based on downlink control information carried by the CCH. The TTI may include a plurality of time symbols in a time domain. The search space may span N time symbols (where N is a positive integer) among the plural time symbols. Each of the CCH candidates may consist of one of the N time symbols in the time domain and L control channel elements (CCEs) in a frequency domain. The search space may include a greatest number of CCH candidates on a first time symbol of the N time symbols.

In each aspect of the present invention, the search space may include a greater number of CCH candidates on a time symbol having a low time symbol index than on a time symbol having a high time symbol index among the N time symbols.

In each aspect of the present invention, configuration information on the search space may be provided to the user equipment.

In each aspect of the present invention, each of the CCH candidates in the search space may consist of CCEs located in the same time symbol.

The above technical solutions are merely some parts of the embodiments of the present invention and various embodiments into which the technical features of the present invention are incorporated can be derived and understood by persons skilled in the art from the following detailed description of the present invention.

Advantageous Effect

According to the present invention, uplink/downlink signals can be efficiently transmitted/received. Therefore, overall throughput of a radio communication system can be improved.

According to an embodiment of the present invention, delay/latency occurring during communication between a user equipment and a base station may be reduced.

In addition, owing to development of smart devices, it is possible to efficiently transmit/receive not only a small amount of data but also data which occurs infrequently.

Moreover, signals can be transmitted/received in the system supporting new radio access technologies.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

MODE FOR INVENTION

Figure 1:
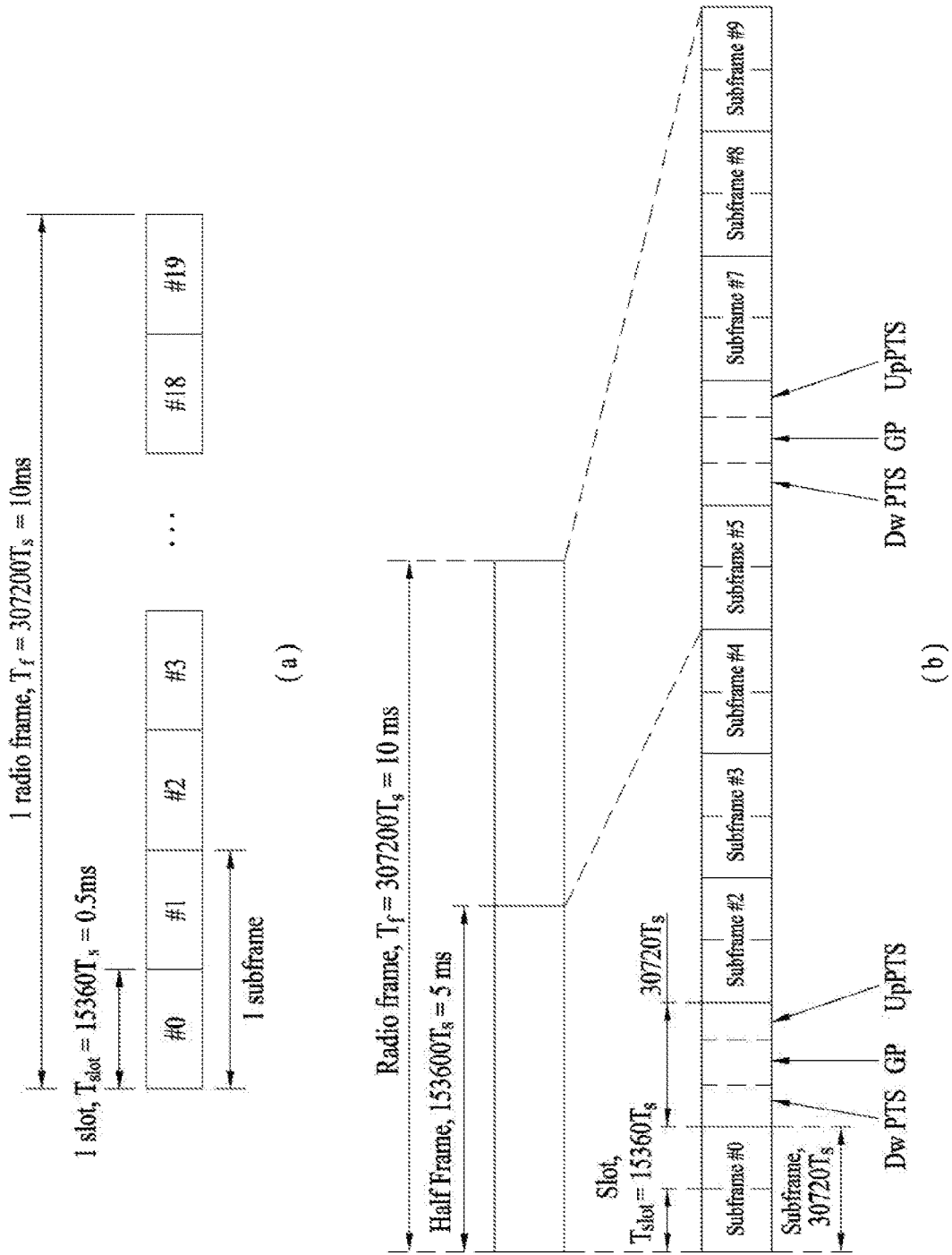
FIG. 1 illustrates the structure of a radio frame used in the LTE/LTE-A based wireless communication system.

Reference will now be made in detail to the examples of the present invention, examples of which are illustrated in the accompanying drawings. The detailed description, which will be given below with reference to the accompanying drawings, is intended to explain examples of the present invention, rather than to show the only examples that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmitting device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmitting devices always sense carrier of a network and, if the network is empty, the transmitting devices wait for determined time according to locations thereof registered in a list and then transmit data. Various methods are used to determine priority of the transmitting devices in the list and to reconfigure priority. In a system according to some versions of IEEE 802.11 standards, collision may occur and, in this case, a collision sensing procedure is performed. A transmitting device using CSMA/CA avoids collision between data transmission thereof and data transmission of another transmitting device using a specific rule.

In examples of the present invention described below, the term "assume" may mean that a subject to transmit a channel transmits the channel in accordance with the corresponding "assumption". This may also mean that a subject to receive the channel receives or decodes the channel in a form conforming to the "assumption", on the assumption that the channel has been transmitted according to the "assumption".

In the present invention, puncturing a channel on a specific resource means that the signal of the channel is mapped to the specific resource in the procedure of resource mapping of the channel, but a portion of the signal mapped to the punctured resource is excluded in transmitting the channel. In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel. In other words, the rate-matched resource is not counted as a resource for the channel in the procedure of resource mapping of the channel. The receiver of the channel receives, demodulates, or decodes the channel, assuming that the specific rate-matched resource is not used for mapping and transmission of the channel.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Detailed CSI-RS configuration may be understood with reference to 3GPP TS 36.211 and 3GPP TS 36.331 documents.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). The carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.321 and 3GPP TS 36.331 may be referenced.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms ($307,200T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A TTI refers to an interval at which data may be scheduled. For example, the transmission opportunity of a UL grant or DL grant is given every 1 ms in the current LTE/LTE-A system. The UL/DL grant opportunity is not given several times within a time shorter than 1 ms. Accordingly, the TTI is 1 ms in the current LTE-LTE-A system.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Figure 2:
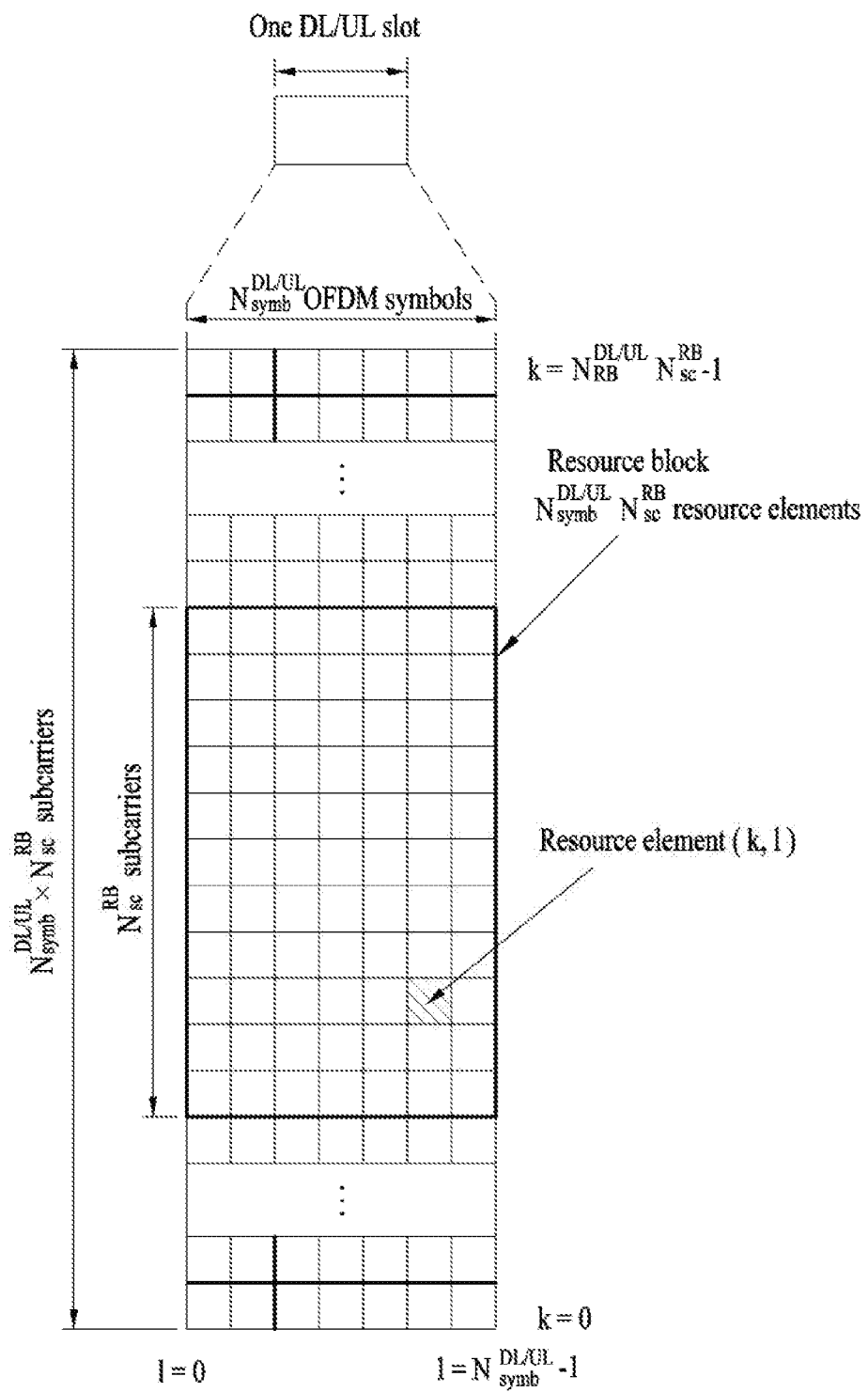
FIG. 2 illustrates the structure of a downlink (DL)/uplink (UL) slot in the LTE/LTE-A based wireless communication system.

FIG. 2 illustrates the structure of a DL/UL slot structure in the LTE/LTE-A based wireless communication system.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, examples of the present invention are similarly applicable to subframes having a different number of OFDM symbols. Referring to FIG. 2, each OFDM symbol $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

Figure 3:
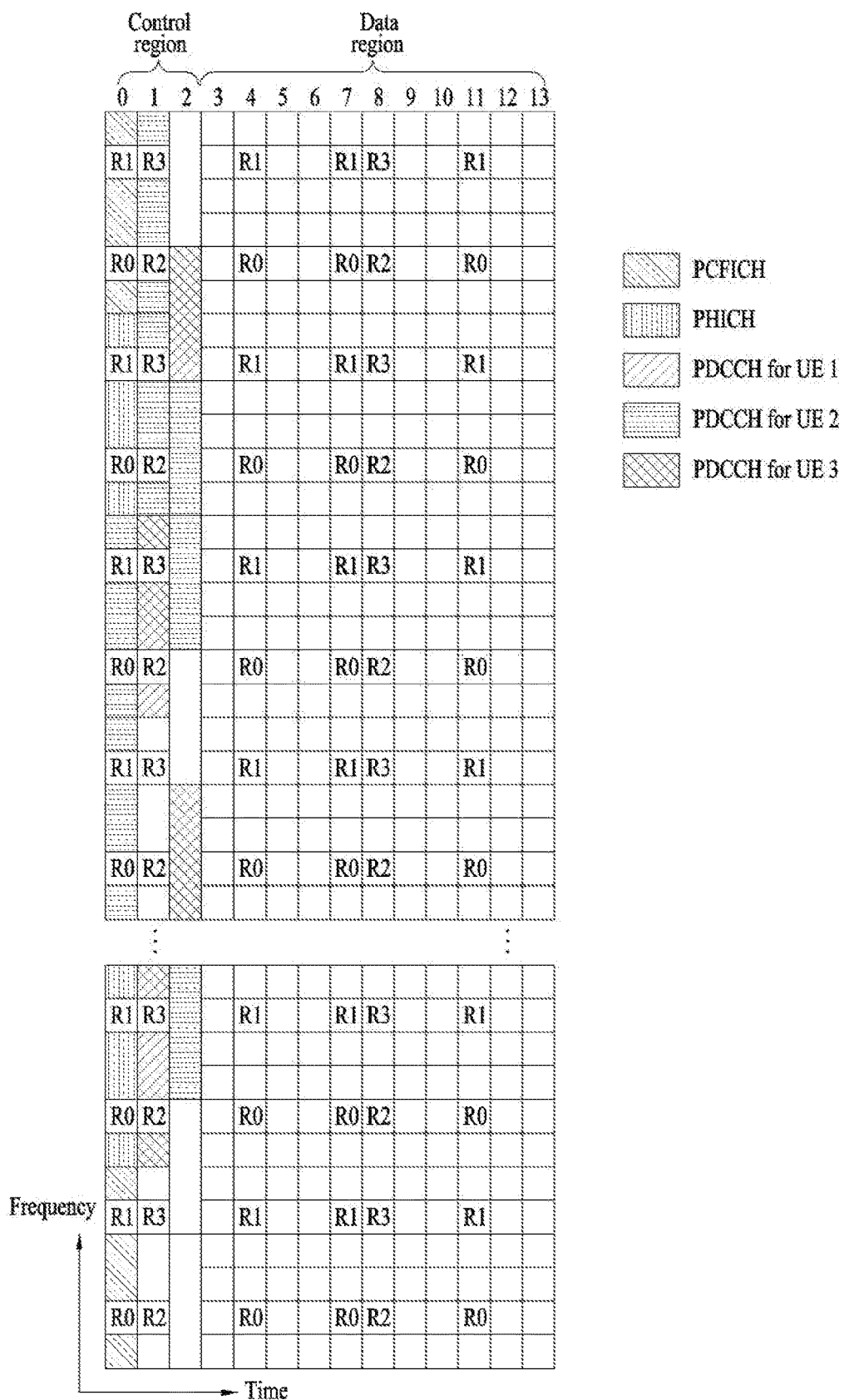
FIG. 3 illustrates the structure of a DL subframe used in the LTE/LTE-A based wireless communication system.

FIG. 3 illustrates the structure of a DL subframe used in the LTE/LTE-A based wireless communication system.

Referring to FIG. 3, a DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, each CCE includes nine REGs, and the nine REGs are distributed over first one/two/three OFDM symbols (or four OFDM symbols if necessary for 1.4 MHz) and over the system bandwidth in order to mitigate interference for the purpose of diversity. One REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

CCEs available for PDCCH transmission in a system may be numbered from 0 to $N_{CCE}-1$, wherein $N_{CCE}=floor(N_{REG}/9)$ and $N_{REG}$ denotes the number of REGs which are not allocated to a PCFICH or a PHICH. A PDCCH consisting of n consecutive CCEs may start only on a CCE fulfilling "i mod n=0", wherein i denotes a CCE number.

Figure 4:
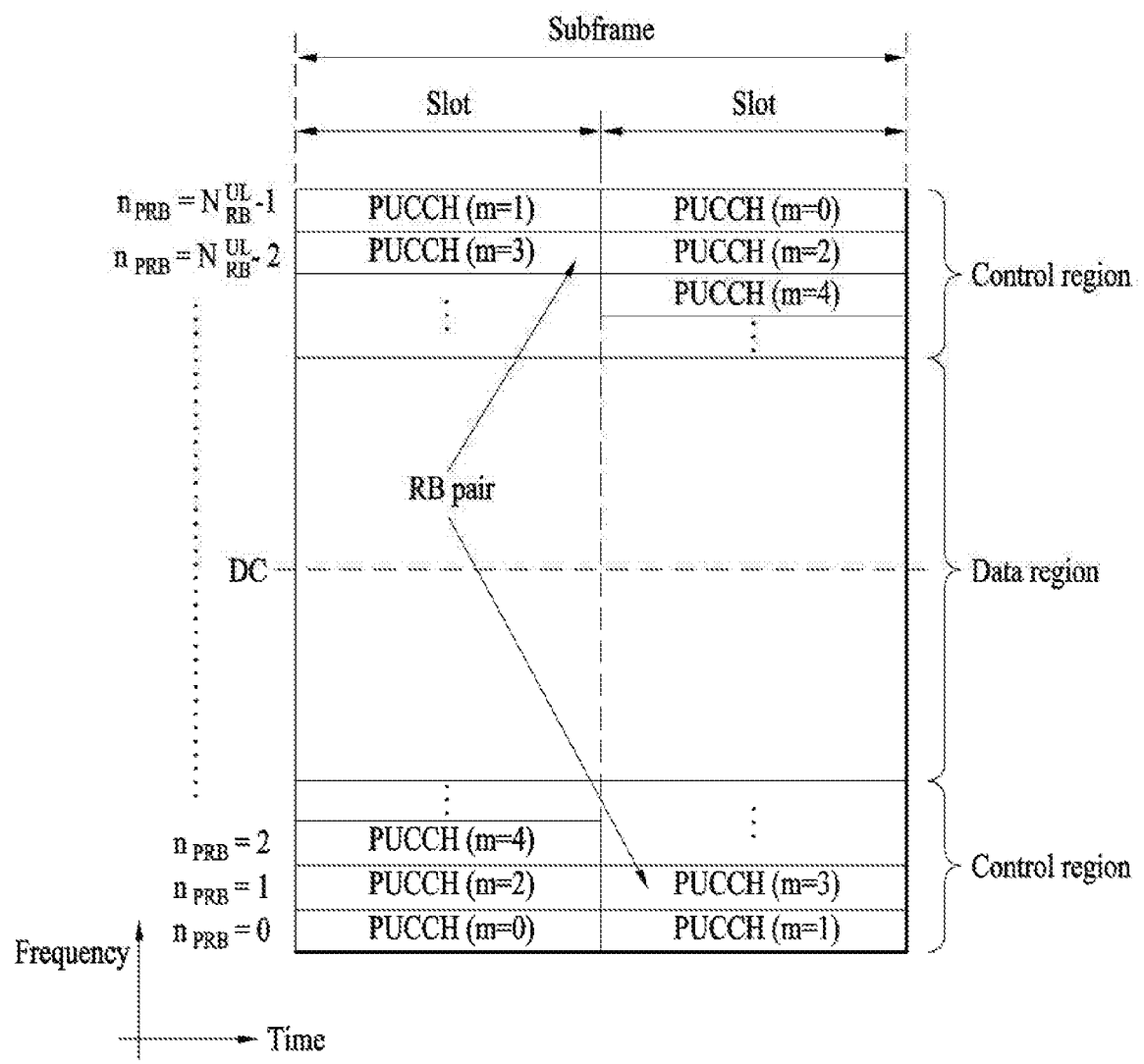
FIG. 4 illustrates the structure of a UL subframe used in the LTE/LTE-A based wireless communication system.

FIG. 4 illustrates the structure of a UL subframe used in the LTE/LTE-A based wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, the PDCCH and/or the PDSCH may be transmitted to the MTC UE having the coverage issue through multiple (e.g., about 100) subframes.

The examples of the present invention can be applied to not only the 3GPP LTE/LTE-A system but also a new radio access technology (RAT) system. As a number of communication devices have required much higher communication capacity, the necessity of mobile broadband communication, which is much enhanced compared to the conventional RAT, has increased. In addition, massive MTC capable of providing various services anytime and anywhere by connecting a number of devices or things to each other has been considered as a main issue in the next generation communication system. Moreover, the design of a communication system capable of supporting services/UEs sensitive to reliability and latency has also been discussed. That is, the introduction of the next generation RAT considering the enhanced mobile broadband communication, massive MTC, Ultra-reliable and low latency communication (URLLC), etc. has been discussed. For convenience of description, the corresponding technology is simply referred to as a new RAT in this specification.

In the next system of LTE-A, a method to reduce latency of data transmission is considered. Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

Better latency than previous generations of 3GPP RATs was one performance metric that guided the design of LTE. LTE is also now recognized by the end-users to be a system that provides faster access to internet and lower data latencies than previous generations of mobile radio technologies.

However, with respect to further improvements specifically targeting the delays in the system little has been done. Packet data latency is important not only for the perceived responsiveness of the system; it is also a parameter that indirectly influences the throughput. HTTP/TCP is the dominating application and transport layer protocol suite used on the internet today. According to HTTP Archive (http://httparchive.org/trends.php) the typical size of HTTP-based transactions over the internet are in the range from a few 10's of Kbytes up to 1 Mbyte. In this size range, the TCP slow start period is a significant part of the total transport period of the packet stream. During TCP slow start the performance is latency limited. Hence, improved latency can rather easily be shown to improve the average throughput, for this type of TCP-based data transactions. In addition, to achieve really high bit rates (in the range of Gbps), UE L2 buffers need to be dimensioned correspondingly. The longer the round trip time (RTT) is, the bigger the buffers need to be. The only way to reduce buffering requirements in the UE and eNB side is to reduce latency.

Radio resource efficiency could also be positively impacted by latency reductions. Lower packet data latency could increase the number of transmission attempts possible within a certain delay bound; hence higher block error ration (BLER) targets could be used for the data transmissions, freeing up radio resources but still keeping the same level of robustness for users in poor radio conditions. The increased number of possible transmissions within a certain delay bound, could also translate into more robust transmissions of real-time data streams (e.g. VoLTE), if keeping the same BLER target. This would improve the VoLTE voice system There are more over a number of existing applications that would be positively impacted by reduced latency in terms of increased perceived quality of experience: examples are gaming, real-time applications like VoLTE/OTT VoIP and video telephony/conferencing.

Going into the future, there will be a number of new applications that will be more and more delay critical. Examples include remote control/driving of vehicles, augmented reality applications in e.g. smart glasses, or specific machine communications requiring low latency as well as critical communications.

Figure 5:
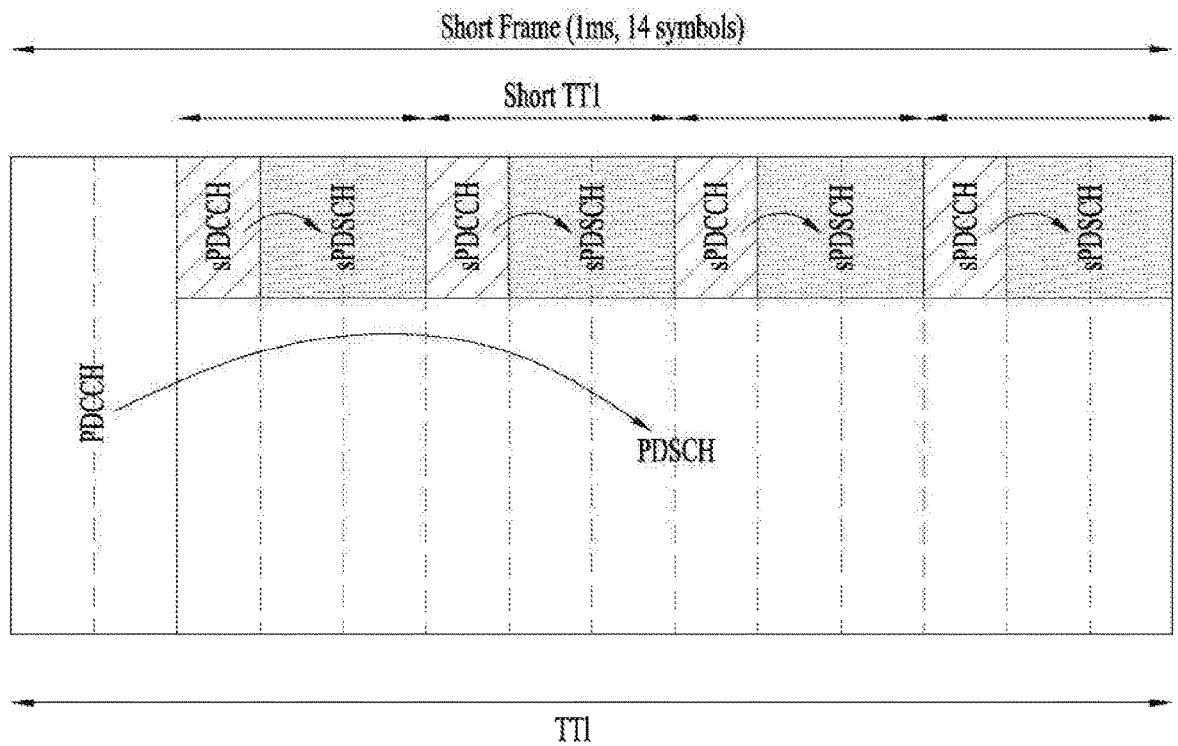
FIG. 5 illustrates an example of a short transmission time interval (TTI) and a transmission example of a control channel and a data channel in the short TTI.

FIG. 5 illustrates an example of a short TTI and a transmission example of a control channel and a data channel in the short TTI.

To reduce a user plane (U-plane) latency to 1 ms, a shortened TTI (sTTI) shorter than 1 ms may be configured. For example, for the normal CP, an sTTI consisting of 2 OFDM symbols, an sTTI consisting of 4 OFDM symbols and/or an sTTI consisting of 7 OFDM symbols may be configured.

In the time domain, all OFDM symbols constituting a default TTI or the OFDM symbols except the OFDM symbols occupying the PDCCH region of the TTI may be divided into two or more sTTIs on some or all frequency resources in the frequency band of the default TTI.

In the following description, a default TTI or main TTI used in the system is referred to as a TTI or subframe, and the TTI having a shorter length than the default/main TTI of the system is referred to as an sTTI. For example, in a system in which a TTI of 1 ms is used as the default TTI as in the current LTE/LTE-A system, a TTI shorter than 1 ms may be referred to as the sTTI. The method of transmitting/receiving a signal in a TTI and an sTTI according to embodiments described below is applicable not only to the system according to the current LTE/LTE-A numerology but also to the default/main TTI and sTTI of the system according to the numerology for the new RAT environment.

In the downlink environment, a PDCCH for transmission/scheduling of data within an sTTI (i.e., sPDCCH) and a PDSCH transmitted within an sTTI (i.e., sPDSCH) may be transmitted. For example, referring to FIG. 5, a plurality of the sTTIs may be configured within one subframe, using different OFDM symbols. For example, the OFDM symbols in the subframe may be divided into one or more sTTIs in the time domain. OFDM symbols constituting an sTTI may be configured, excluding the leading OFDM symbols on which the legacy control channel is transmitted. Transmission of the sPDCCH and sPDSCH may be performed in a TDM manner within the sTTI, using different OFDM symbol regions. In an sTTI, the sPDCCH and sPDSCH may be transmitted in an FDM manner, using different regions of PRB(s)/frequency resources.

<OFDM Numerology>

The new RAT system uses an OFDM transmission scheme or a similar transmission scheme. For example, the new RAT system may follow the OFDM parameters defined in the following table.

TABLE 1

| Parameter | Value |
| --- | --- |
| Subcarrier-spacing | 75 kHz |
| OFDM symbol length | 13.33 us |
| Cyclic prefix (CP) length | 1.04 us/0/94 us |
| System BW | 100 MHz |
| No. of available subcarriers | 1200 |
| Subframe length | 0.2 ms |
| Number of OFDM symbols per Subframe | 14 symbols |

<Analog Beamforming>

In millimeter wave (mmW), the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of 0.5λ (wavelength). Therefore, in mmW, increasing the coverage or the throughput by increasing the beamforming (BF) gain using multiple antenna elements is taken into consideration.

If a transceiver unit (TXRU) is provided for each antenna element to enable adjustment of transmit power and phase, independent beamforming is possible for each frequency resource. However, installing TXRU in all of the about 100 antenna elements is less feasible in terms of cost. Therefore, a method of mapping a plurality of antenna elements to one TXRU and adjusting the direction of a beam using an analog phase shifter is considered. This analog beamforming method may only make one beam direction in the whole band, and thus may not perform frequency selective beamforming (BF), which is disadvantageous.

Hybrid BF with B TXRUs that are fewer than Q antenna elements as an intermediate form of digital BF and analog BF may be considered. In the case of hybrid BF, the number of directions in which beams may be transmitted at the same time is limited to B or less, which depends on the method of collection of B TXRUs and Q antenna elements.

<Subframe Structure>

Figure 6:
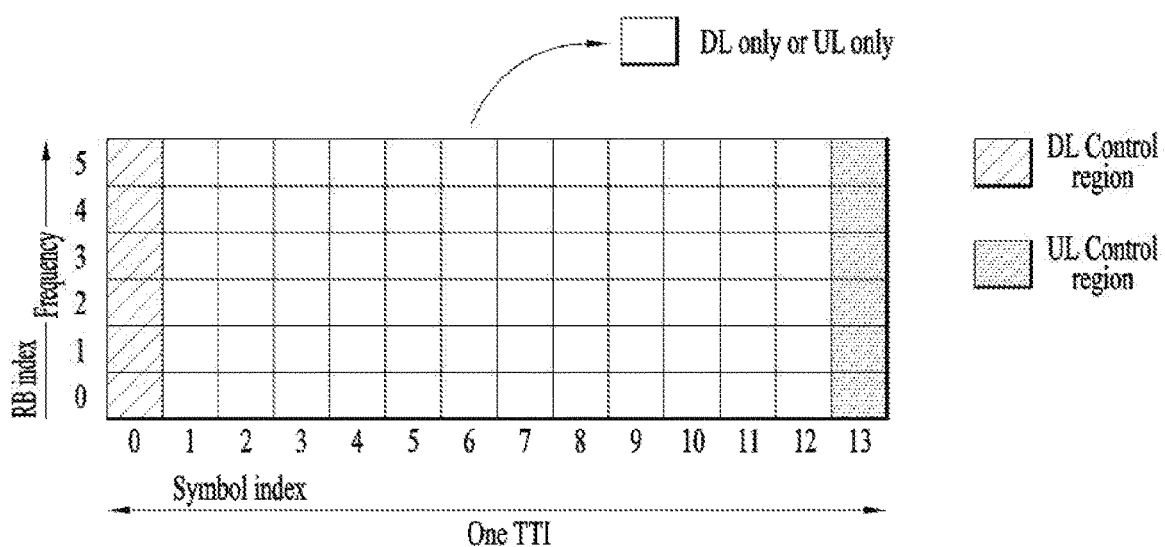
FIG. 6 illustrates a subframe structure.

FIG. 6 illustrates a subframe structure in a new radio access technology (NR).

To minimize data transmission latency, a self-contained subframe structure in which a control channel and a data channel are time-division-multiplexed (TDMed) is considered in 5G new RAT.

In FIG. 6, the hatched area represents the transmission region of a DL control channel (e.g., PDCCH) carrying the DCI, and the black area represents the transmission region of a UL control channel (e.g., PUCCH) carrying the UCI. Here, the DCI is control information that the eNB transmits to the UE. The DCI may include information on cell configuration that the UE should know, DL specific information such as DL scheduling, and UL specific information such as UL grant. The UCI is control information that the UE transmits to the eNB. The UCI may include a HARQ ACK/NACK report on the DL data, a CSI report on the DL channel status, and a scheduling request (SR).

In FIG. 6, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the subframe structure, DL transmission and UL transmission may be sequentially performed in one subframe, and thus transmission/reception of DL data and reception/transmission of UL ACK/NACK for the DL data may be performed in one subframe. As a result, the time taken to retransmit data when a data transmission error occurs may be reduced, thereby minimizing the latency of final data transmission.

In such a subframe structure, a time gap is needed for the process of switching from the transmission mode to the reception mode or from the reception mode to the transmission mode of the eNB and UE. On behalf of the process of switching between the transmission mode and the reception mode, some OFDM symbols at the time of switching from DL to UL in the subframe structure are set as a guard period (GP).

In a legacy LTE/LTE-A system, the DL control channel is TDMed with the data channel (refer to FIG. 3) and the PDCCH, which is the control channel, is distributively transmitted throughout an entire system band. However, in the new RAT, it is expected that the bandwidth of one system reaches approximately a minimum of 100 MHz and it is difficult to distributively transmit the control channel throughout the entire band. For data transmission/reception, if the UE monitors the entire band to receive the DL control channel, this may cause increase in battery consumption of the UE and deterioration in efficiency. Accordingly, the present invention proposes a scheme of locally or distributively transmitting the DL control channel in a partial frequency band within a system band, i.e., within a channel band.

Figure 7:
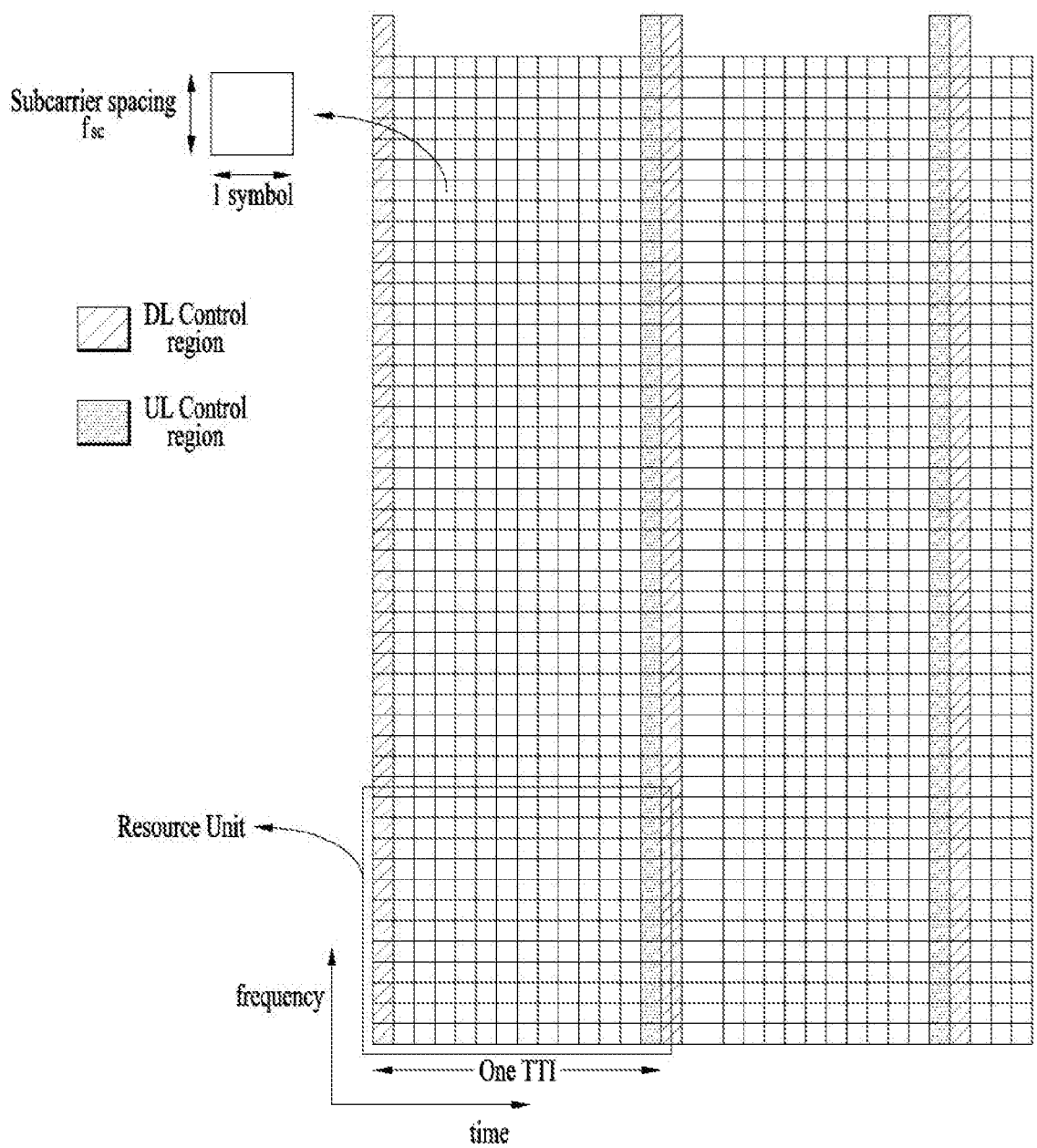
FIG. 7 illustrates a part of a radio frame based on a subframe structure in which a data channel and a control channel are time-division-multiplexed.

FIG. 7 illustrates a part of a radio frame based on a subframe structure in which a data channel and a control channel are TDMed.

Referring to FIG. 7, in a wideband system, a DL control channel can be Time Division Multiplexed (TDMed) with DL data or UL data and then transmitted. In this case, although an eNB may transmit a DL control channel(s) over the entire band, but one UE may receive its DL control channel in specific partial band rather than the entire band. In this case, the DL control channel corresponding to information transmitted from the eNB to the UE may contain not only DL specific information such as DL scheduling but also information on a cell configuration and UL specific information such as UL grant.

As illustrated in FIG. 7, a basic resource unit (RU) for DL/UL scheduling may be defined even in a new RAT system as well as in the legacy LTE system. A plurality of OFDM symbols is included in the time domain and a plurality of subcarriers is included in the frequency domain. The basic RU may be defined with different sizes in UL and DL. The eNB may perform DL/UL data scheduling for the UE in units of RUs, i.e., in units of RUs of an integer. In FIG. 7, one box of a time-frequency resource grid, i.e., one subcarrier of one OFDM symbol length, may be defined as a resource element (RE).

For example, it is expected that the new RAT system, which is called the mmWave system or5G system, will use wide system bandwidth. Specifically, depending on the frequency band, the minimum system bandwidth of 5 MHz, 10 MHz, 40 MHz, 80 MHz, etc. should be able to be supported. The minimum system band may vary according to the basic subcarrier spacing. For example, when the basic subcarrier spacing is respectively set to 15 kHz, 30 kHz, 120 kHz, and 240 kHz, the minimum system band may be 5 MHz, 10 MHz, 40 MHz, and 80 MHz, respectively. For example, the new RAT system is designed such that it operates on not only 6 GHz or less but 6 GHz or more and a plurality of subcarrier spacings are used in one system to support various scenarios and use cases. When the subcarrier spacing is changed, the length of a subframe can increase/decrease according to the change in the subcarrier spacing. For example, one subframe may be defined to have a short time period, for example, 0.5 ms, 0.25 ms, 0.125 ms, etc. It is expected that the new RAT system will use high frequency band (e.g., 6 GHz or higher) and support a subcarrier spacing greater than 15 kHz, i.e., the subcarrier spacing of the conventional LTE system. Assuming that the subcarrier spacing is 60 kHz, one resource unit (RU) can be defined as twelve subcarriers in the frequency domain and one subframe in the time domain.

Figure 8:
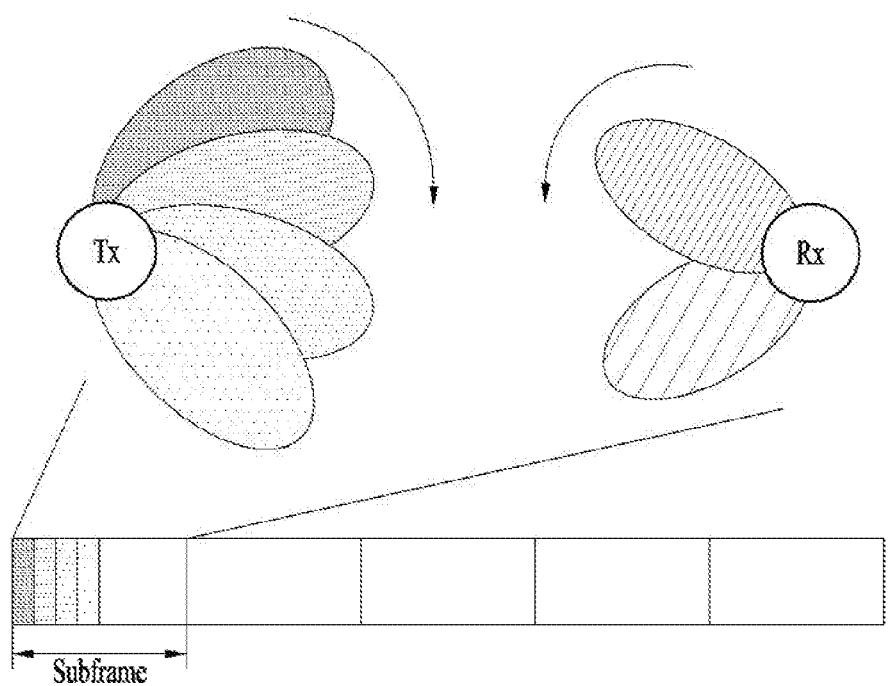
FIG. 8 illustrates an application example of analog beamforming.

FIG. 8 illustrates a transmission/reception method of a radio signal using an analog beam. Particularly, FIG. 8 illustrates a transmission/reception method of a radio signal by transmission/reception (Tx/Rx) analog beam scanning.

Referring to FIG. 8, if the eNB transmits a synchronization signal in a cell or on a carrier while switching beams, the UE performs synchronization with the cell/carrier using the synchronization signal detected in the cell/carrier and searches for a (beam) direction which is most matched therefor. Through this process, the UE should be able to acquire a cell ID and a beam ID (corresponding to the beam direction). While the UE acquires the beam ID, the UE may acquire a signal transmitted in the beam direction, particularly, RS information, for example, an RS sequence, seed information, or a location. The eNB may allocate a group ID to UEs that have acquired a specific beam ID, i.e., UEs capable of receiving a DL channel in a specific beam direction and transmit cell-common information to the UEs by being divided in time/space on a beam ID basis. The cell-common information may be transmitted to the UEs by a beam ID common scheme.

A UE that has acquired a beam ID in the cell receives cell-specific information as beam ID or group ID specific information. The beam ID or group ID specific information may be information that UEs of a corresponding group commonly receive.

<Configuration Scheme of Control Channel>

Similarly to defining a basic unit for data scheduling as an RU, a basic unit for control information may be defined. The basic unit for configuring the control information may be defined as a control channel unit (CCU). One CCU consists of one or more mini-CCUs (mCCUs). An mCCU may be defined as a set of specific N REs (where N≥1). That is, the mCCU is defined as a set of N REs and one or more mCCUs may constitute one CCU. When one CCU consists of one mCCU, the CCU consists of a set of specific N REs. One or more CCUs may constitute one meaningful control channel (CCH). The meaning of "one meaningful CCH" represents that meaningful information may be transmitted through one CCH and that one CCH may be used to transmit specific information in a cell or to UE(s) or instruct the UE(s) to perform a specific behavior. Hereinbelow, the term "CCU" may be replaced with the term "CCE". A scheme of configuring CCEs constituting one CCH and a scheme of configuring a search space of a UE will be described hereinbelow.

A scheme of configuring a search space of a PDCCH defined in the legacy LTE standard will now be described. A set of CCEs on which the UE can discover a PDCCH thereof is referred to as a PDCCH search space or simply as a search space. An individual resource on which the PDCCH can be transmitted in the search space is called a PDCCH candidate. A set of PDCCH candidates that the UE is to monitor is defined as a search space. Herein, a search space $S^{(L)}_k$ in an aggregation level $L \in \{1,2,4,8\}$ is defined by a set of candidates of the PDCCH. A search space may have a different size and a dedicated search space and a common search space are defined. The dedicated search space is a UE-specific search space (USS) and is configured for each individual UE. The common search space (CSS) is configured for a plurality of UEs. The following table shows an example of aggregation levels for defining search spaces.

TABLE 2

| Type | Search space $S^{(L)}_k$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

The control region of each serving cell consists of a set of CCEs, numbered from 0 to $N_{CCE,k}-1$, where $N_{CCE,k}$ is the total number of CCEs in the control region of subframe k. In a 3GPP LTE/LTE-A system, a set of CCEs on which a PDCCH can be located for each UE is defined. The UE monitors a set of PDCCH candidates on one or more activated serving cells configured as serving cells by higher-layer signaling for control information. Herein, monitoring means that the UE implies attempting to decode each of PDCCHs in a set according to all monitored DCI formats. For each serving cell, on which a PDCCH is monitored, CCEs corresponding to PDCCH candidate m of a search space $S^{(L)}_k$ are given by "L*{$Y_k$+m'} mod floor($N_{CCE,k}$/L)+ i", where, i=0, . . . , L−1. For the common search space, m'=m. For the PDCCH UE specific search space, for the serving cell on which the PDCCH is monitored, if the monitoring UE is configured with carrier indicator field, then m'=m+$M^{(L)}$*$n_{CI}$ (where, $n_{CI}$ is the carrier indicator field (CIF) value), else if the monitoring UE is not configured with carrier indicator field, then m'=m (where m=0,1, . . . , $M^{(L)}$−1). $M^{(L)}$ is the number of PDCCH candidates to monitor with an aggregation level L in the given search space. The carrier aggregation field value may be equal to a serving cell index ServCellIndex. For the common search spaces, $Y_k$ is set to 0 for the two aggregation levels L=4 and L=8. For the UE-specific search space $S^{(L)}_k$ at an aggregation level L, the variable $Y_k$ is defined by "$Y_k$=(A·$Y_{k-1}$) mod D", where, $Y_{-1}$=$n_{RNTI}$≠0, A=39827, D=65537 and k=floor ($n_s$/2), and $n_s$ is the slot number within a radio frame.

In a legacy LTE system, the number of OFDM symbols used to transmit a control channel is dynamically changed in every subframe and the maximum number of CCE indexes is determined correspondingly thereto. Unlike the legacy LTE system, in a new RAT system, it is desirable to number CCE indexes with respect to each (OFDM/time) symbol. The present invention proposes an indexing method of a CCE, which is a basic unit constituting a CCH. When N REs constitute one CCE, an index of the CCE is determined by an entire frequency band and the maximum number of CCE indexes may be defined as follows: $M_{max\_CCU}$=floor{$BW_{CCH}$/(N*$f_0$)}. $M_{max\_CCU}$ is the maximum number of CCEs, $BW_{CCH}$ may be a system bandwidth, a bandwidth in which DL control channels are to be multiplexed, or a bandwidth that DL control channels can span, N is the number of REs constituting one CCE, and $f_0$ is a subcarrier spacing for control channel transmission. $BW_{CCH}$ may be UE-specific and/or use case-specific. The UE assumes that $BW_{CCH}=BW_{SYSTEM}$ unless signaled otherwise. Alternatively, $BW_{CCH}$ may be cell-common and may be obtained from an initial access procedure. The eNB provides signaling of $BW_{CCH}$ in which the UE needs to monitor control channels. There may be a plurality of $BW_{CCH}$ in which control channels of a plurality of UEs are multiplexed and transmitted and the eNB may transmit this information to a UE. The UE may receive a plurality of different $BW_{CCH}$. The UE may acquire information about bandwidth $BW_{CCH}$ in which a control channel is transmitted through system information obtained in the initial access procedure. The eNB may signal a control channel transmission band that the UE may assume or a control channel transmission band that the eNB uses through a system information transmission channel such as a PBCH. For example, the eNB may signal information about $BW_{CCH}$ and a band in which a corresponding control channel is transmitted, i.e., frequency location information. When the number of $BW_{CCH}$ is plural, the frequency location information of each $BW_{CCH}$ is also signaled.

When analog beamforming is used in the new RAT system, it is undesirable to transmit one CCH over a plurality of symbols. Therefore, CCE indexes constituting a CCH are defined with respect to each symbol and a plurality of CCEs constituting one CCH may be limitedly located only within one symbol. Even if CCE indexes are numbered with respect to all OFDM symbols used as a control channel, the plural CCEs constituting one CCH may be restricted to be located only within one symbol. In other words, the CCH may be defined to be configured only by CCEs within the same symbol.

<Maximum Number of Blind Detections (BDs), Number of BDs on each Symbol, and BD at each Aggregation Level on each Symbol>

To receive a data channel, the UE should first receive a control channel. To receive the control channel, the UE needs to perform blind detection (BD) for the control channel to identify whether a specific channel/location is a channel of the UE. The number of BDs performed by the UE within one subframe or within a basic time unit in which the control channel can be transmitted should be limited to a specific value. Assume that the maximum number of BDs during a corresponding reference time is $N_{max\_BD}$. In addition, assume that a duration of OFDM symbol(s) used as the control channel within one subframe or a data scheduling time unit is $R_{ctrl}$ and the number of OFDM symbols constituting $R_{ctrl}$ is $N_{OFDM\_control}$. The total sum of BDs on each OFDM symbol in $R_{ctrl}$ cannot exceed $N_{max\_BD}$ and the number of BDs performed by the UE per OFDM symbol n in $R_{ctrl}$ should be properly distributed on each symbol within the maximum number of BDs that the UE can perform.

An element that should be additionally considered to distribute the maximum number of BDs of the UE to OFDM symbols is a CCE aggregation level. That is, a search space of the UE may be differently determined according to how many CCEs constitute one CCH and the number of BDs per CCE aggregation level should also be determined. If a CCE aggregation level of the UE supported by a system is L={a, b, c, d, e, ... } (wherein a, b, c, d, e, ... are integers equal to or greater than 1, for example, 1, 2, 4, 8, 16, ... ), one CCH may consist of a CCEs, b CCEs, c CCEs, d CCEs, e CCEs, etc. Each of these numbers a, b, c, d, e, ... is referred to as a CCE aggregation level. An aggregation level supported by a system may be different from an aggregation level used to transmit a CCH to a specific UE. The aggregation level for the specific UE may be determined by a set of the aggregation levels supported by the system. When aggregation level candidates configured by the system are present, the UE should perform BD for a control channel according to the number of BDs per aggregation level candidate on $N_{OFDM\_control}$ OFDM symbols constituting $R_{ctrl}$. The number of BDs performed by the UE may be explicitly signaled by the eNB at each CCE aggregation level on each OFDM symbol. Alternatively, the number of BDs may be predetermined by a specific value or a scheduled function between the eNB and the UE.

There may be additional explicit signaling for (or indicating) $N_{OFDM\_control}$ to the UE. Alternatively, the UE may be implicitly aware of $N_{OFDM\_control}$ by subframe configuration. In this case, the maximum number $N_{max\_BD}$ of BDs of the UE may be semi-evenly distributed over $N_{OFDM\_control}$ OFDM symbols. If the value of $N_{max\_BD}$ cannot be accurately divided by $N_{OFDM\_control}$ it is desirable to perform more BDs on an OFDM symbol having a low symbol index. For example, since there is a high possibility that the CCH is to be transmitted on the first OFDM symbol, a search space may be configured such that the UE performs more BDs on the first OFDM symbol. That is, the search space may be configured such that the number of CCH candidates located on an OFDM symbol having a low symbol index is greater than the number of CCH candidates located on an OFDM symbol having a high symbol index. The eNB may configure the search space so as to locate more CCH candidates on an OFDM symbol having a lower symbol index relative to an OFDM symbol having a high symbol index. Such BD distribution may be performed with respect to each CCE aggregation level.

Meanwhile, if the UE should perform BD in a state in which there is no additional signaling for $N_{OFDM\_control}$ or the UE cannot be implicitly aware of $N_{OFDM\_control}$, a high weight should be assigned to an OFDM symbol having a low symbol index so that more BDs may be performed on the OFDM symbol having the low symbol index. The UE performs BD within the distributed number of BDs on the first OFDM symbol. If no CCH is detected on the first OFDM symbol, the UE may perform BD on the second OFDM symbol within the distributed number of BDs to detect the CCH. In this case, a more number of BDs may be distributed to an OFDM symbol having a low symbol index relative to an OFDM symbol having a high symbol index. That is, the eNB may configure the search space such that more CCH candidates are located on an OFDM symbol having a low index relative to an OFDM symbol having a high symbol index. This BD distribution scheme may also be performed with respect to each CCE aggregation level.

The (maximum) number/capabilities of BDs and distribution of BD mentioned in the present invention may be individually configured/performed with respect to each CCE aggregation level.

<Search Space Configurations>

Figure 9:
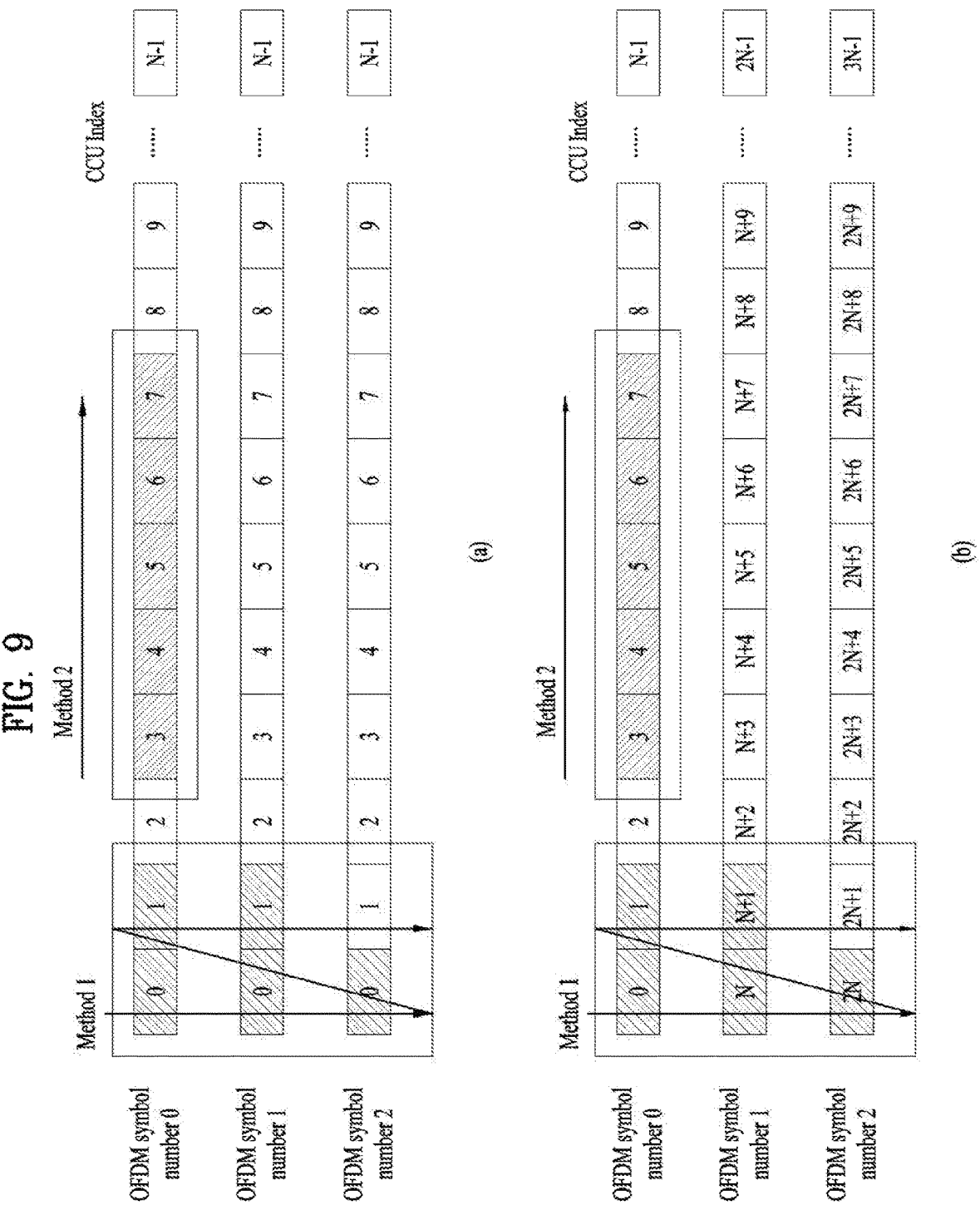
FIGS. 9 to 11 illustrate control channel element (CCE) mapping methods.
Figure 10:
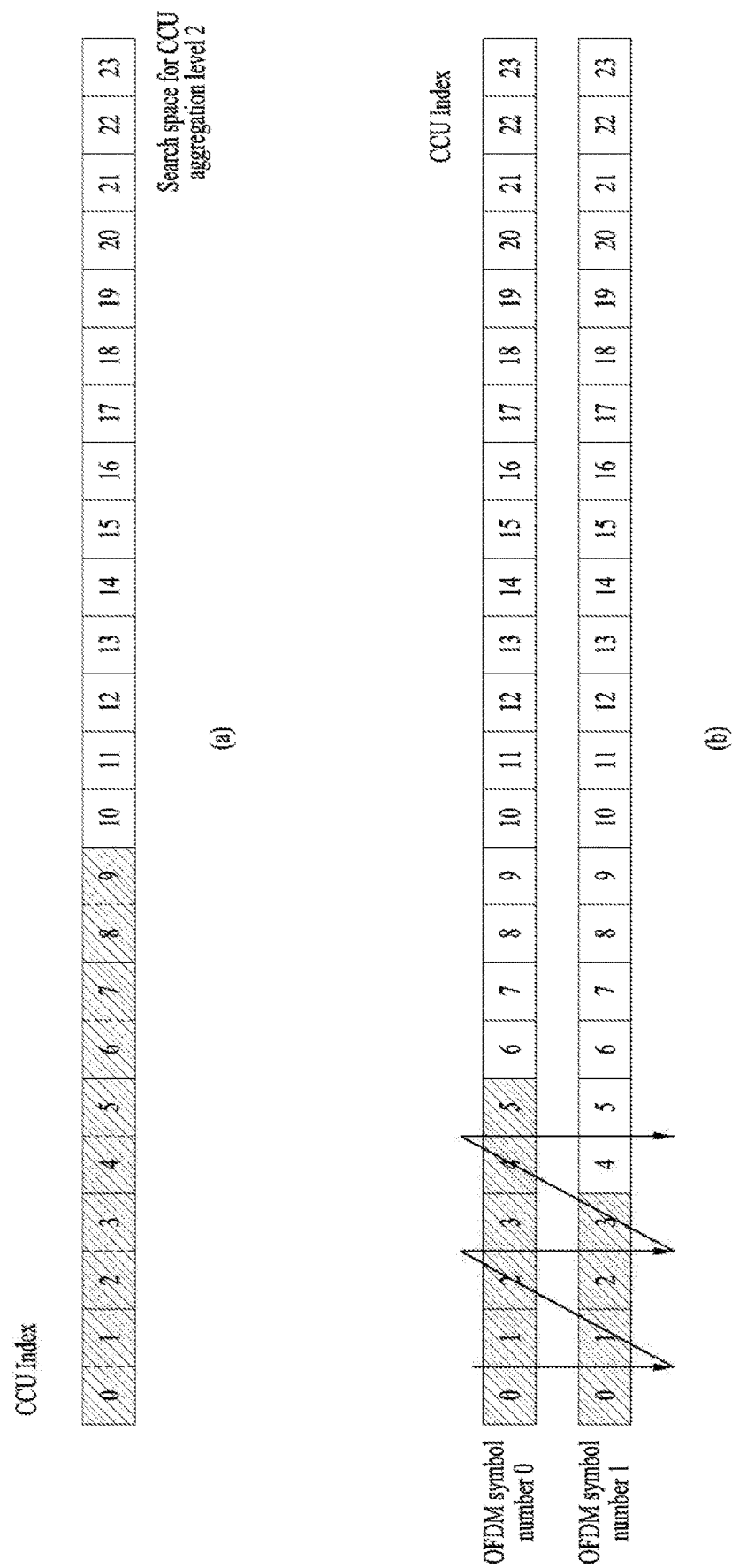
Figure 11:
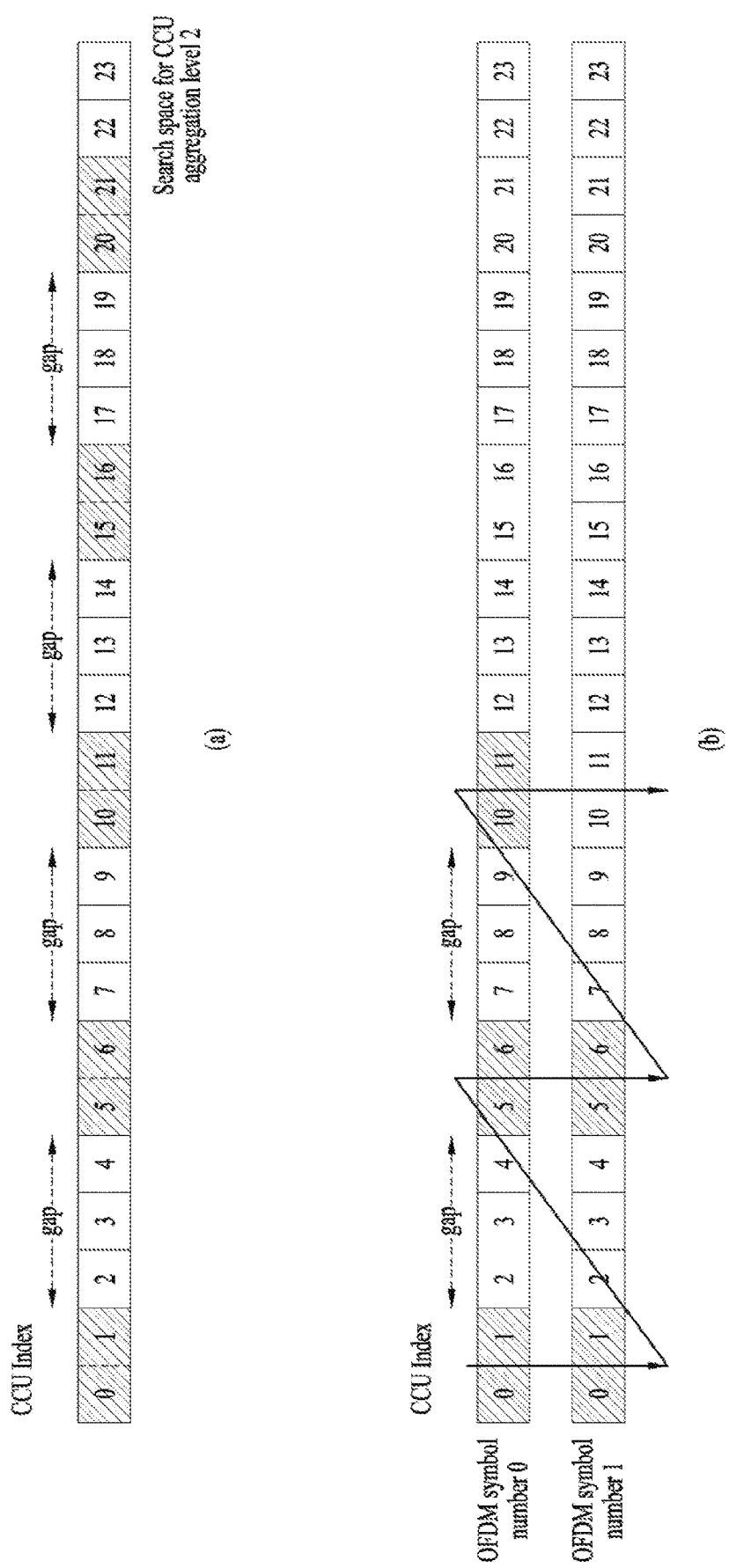

FIGS. 9 to 11 illustrate CCE mapping methods. In FIGS. 9 to 11, a CCU may be a CCE. In FIGS. 9 to 11, a CCE index means a logical index of a CCE.

Hereinafter, a scheme of configuring a search space at each aggregation level within the number of BDs of the UE and OFDM symbols constituting and $R_{ctrl}$ will be described in more detail. The number of CCEs constituting one CCH may be defined as a CCE aggregation level. For example, if one CCE constitutes one CCH, the CCE aggregation level may be 1 and, if two CCEs constitute one CCH, the CCE aggregation level may be 2. The CCE aggregation level may be determined based on a data service characteristic of a specific UE, a channel state of the UE, or capabilities of the UE. One UE may have a plurality of CCE aggregation levels and a CCE search space may be defined with respect to each aggregation level and may be configured for the UE. When the search space is configured with respect to each aggregation level, if the search space for a CCH corresponding to a specific aggregation level is limited to one symbol, this may damage a freedom degree of eNB scheduling. In consideration of this point, the search space for each aggregation level may be designated with respect to $N_{OFDM\_control}$ symbols constituting $R_{ctrl}$.

A scheme of mapping each of a plurality of CCEs constituting one CCH in a time-frequency region may broadly include a time-first mapping method and a frequency-first mapping method. Referring to FIG. 9, FIG. 9 illustrates a CCE mapping method when a CCE aggregation level is 1 as an example of indexing CCEs to each OFDM symbol. Particularly, FIG. 9(a) illustrates a CCE mapping scheme when CCEs are indexed to each OFDM symbol and FIG. 9(b) illustrates a CCE mapping scheme when CCEs are indexed to $N_{OFDM\_control}$ OFDM symbols.

Assuming that the number of OFDM symbols usable for control channel transmission is 3, Method 1 (time-first mapping method) is a method of configuring a search space of the UE for a specific CCE aggregation level (e.g., 1) over all OFDM symbols usable for CCH transmission and Method 2 (frequency-first mapping method) is a method of restricting the search space of the UE within one OFDM symbol (with respect to a specific CCE aggregation level) or configuring the search space of the UE by consecutive CCEs on a logical index. For example, in Method 1, if the number of CCH candidates is K, A is defined as the "quotient obtained by dividing K by $N_{OFDM\_control}$", and B is defined as the "remainder obtained by dividing K by $N_{OFDM\_control}$", A CCH candidates are allocated to each of OFDM symbol indexes 0 to $N_{OFDM\_control}-1$ and one CCH candidate may further be allocated to OFDM symbol indexes 0 to B-1. In addition, in Method 1 for example, a CCH candidate index k (where k=0, 1, ..., K-1) may be mapped to an OFDM symbol index (k modulo ($N_{OFDM\_control}-1$)).

Method 1 may be reasonable when analog beamforming in which only a limited number of beam directions are formed with respect to one symbol is considered. As compared with Method 1, Method 2 has a disadvantage of causing a restriction on scheduling because, if a search space of a specific UE is not configured, other symbols cannot be used although subsequent OFDM symbols should be used when there are many UEs scheduled in the same direction on one symbol.

However, Method 2 may be applied to a UE or a usage scenario/use case/service, which is not critical to control channel decoding latency. Information indicating which method of the time-first CCE mapping method and a frequency-first CCE mapping method is used to configure a control channel may be UE-specifically, usage scenario-specifically/use case-specifically/service-specifically configured for the UE by higher-layer signaling. Such configurability may be subband-specifically (or carrier-specifically) designated. For example, a CCE may be mapped to a control channel in a specific subband by the time-first mapping method and in another specific subband by the frequency-first mapping method.

Similarly, a scheme of limiting CCEs constituting one CCH to one symbol and a scheme of configuring CCEs constituting one CCH over a plurality of symbols may be UE-specifically or scenario-specifically/use case-specifically/service-specifically/subband-specifically indicated. The eNB may preindicate information indicating whether a CCH is configured by CCE(s) present on one symbol or by CCE(s) present on a plurality of symbols through higher-layer signaling. This information may differ according to use case or specific subband. The UE may receive signaling for different CCH configuration schemes according to specific use case or subband. In one system, the UE receives/decodes a control channel, which is differently configured according to use case or subband, according to a configuration scheme of the control channel.

Hereinafter, control channel mapping and BD/search space configuration of the UE based on Method 1 will be described.

The present invention proposes a scheme of limitedly configuring one CCH within one symbol and differently configuring a search space of the UE according to the value of $N_{OFDM\_control}$. For example, even when $N_{OFDM\_control}>1$, the search space of the UE may be configured according to the time-first mapping method as in Method 1 in FIG. 9.

A search space may be designed such that as the number of OFDM symbols on which a control channel is transmitted is relatively small, the number of BDs of the UE on each symbol increases. A search space of the UE in which the UE should perform BD with respect to each aggregation level may be configured on the assumption that $N_{OFDM\_control}=1$ or predetermined by a specific function relationship between the eNB and the UE in a similar way to an LTE system. When $N_{OFDM\_control}>1$, the number of BDs of the UE on each OFDM symbol constituting $R_{ctrl}$ with respect to each aggregation level becomes smaller as $N_{OFDM\_control}$ increases. That is, since the maximum number of BDs of the UE is distributed on $N_{OFDM\_control}$ symbols, the number of BDs of the UE decreases as the value of $N_{OFDM\_control}$ increases. Accordingly, the search space of the UE with respect to each CCE aggregation level differs according to the value of $N_{OFDM\_control}$.

A scheme for configuring the search space for the UE is proposed as follows.

For convenience, the case in which the number of BDs is 5 and the maximum number of CCE indexes per symbol is 24 when the CCE aggregation level is 2 is illustrated in FIG. 10(a). While the present invention is described with reference to FIG. 10(a) by way of example, the present invention is not limited to the example of FIG. 10(a).

A search space per aggregation level may be configured for the UE. The search space may be configured based on the number $N_{OFDM\_control}$ (=1) of OFDM symbols used as the control channel. Referring to FIG. 10, for example, when the aggregation level is 2, CCE indexes 0 to 9 may be determined as the search space by a function or additional signaling for determining the search space of the UE. In this case, the number of BDs of the UE with respect to the search space of aggregation level=2 is a maximum of 5.

A UE for which the search space is configured performs BD for a CCH in a search space for an aggregation level configured therefor in every subframe or at every interval during which a DL control channel is transmitted and an actual start timing of a logical index may differ at every BD timing by a hash function.

A search space for each aggregation level L based on $N_{OFDM\_control}=1$ may be referred to as SS_L. Then, when $N_{OFDM\_control}>1$, the search space for each aggregation level L on each OFDM symbol is determined based on SS_L. Notably, the search space of the UE is determined by the aforementioned time-first mapping method. For example, when $NN_{OFDM\_control}=2$, the CCH may be configured as illustrated in FIG. 10(b) based on SS_L. In this case, a CCE index in which the search space is started on the second OFDM symbol may be simply equal to a start CCE index on the first symbol. That is, the start CCE index of the search space may be determined using a hash function value which has been used on the first symbol. However, for randomization to prevent collision with another UE for the control channel, it is desirable to randomize the start CCE index according to symbols using another hash value on the second symbol. That is, a hash function for determining the start index of the search space among logical indexes should be a function of a symbol index as well as a function of a subframe index.

Although FIG. 10 illustrates a scheme of mapping CCEs having continuous CCE logical indexes to the CCH, a scheme of mapping CCEs having discontinuous CCE logical indexes to the CCE as illustrated in FIG. 11 may also be considered.

The search space of the UE may be discontinuously configured in terms of a CCE logical index. If the search space is configured by CCEs having discontinuous CCE logical indexes, a gap between the discontinuous CCE logical indexes, i.e., the number of CCEs separated between CCEs constituting the search space, may be signaled. Alternatively, information about the gap is reflected in a function for determining the search space between the eNB and the UE and the search space of the UE may become a function of the gap. Gaps having different values may be present in the search space. Alternatively, gaps having different values may be applied according to the search space. However, in order to reduce the probability of collision with other UEs, it is desirable to maintain the same gap interval. An independent gap value is provided with respect to each aggregation level and the gap value may be UE-specific. Similarly, in order to reduce possibility of collision with CCHs of other UEs, UEs within one cell or UEs simultaneously receiving a service may have the same value. A start timing of the search space of the UE and a CCE index interval between search spaces may be configured with respect to each aggregation level.

When the number of OFDM symbols for a control channel is not dynamically/explicitly signaled and thus the UE should blindly detect the number of OFDM symbols for the control channel, a high weight may be assigned to the first OFDM symbol as illustrated in FIG. 11(b) to cause the UE to search for more CCHs on the first OFDM symbol. In other words, the search space may be configured such that more CCH candidates within the search space may be present on the first OFDM symbol. If BD should be performed even on an OFDM symbol used for the control channel, the maximum number of OFDM symbols capable of being used for the control channel may be semi-statically signaled to the UE or may be fixed in a system so that the UE may assume a specific value. The UE may be configured to perform BD by assigning the highest weight to the first symbol among OFDM symbols capable of being used for the control channel. The search space may also be configured such that a high weight is assigned as an OFDM symbol index becomes lower. For example, the meaning of assigning weight may mean that a greater number of search spaces are configured on the first OFDM symbol and the lowest number of search spaces are configured on an OFDM symbol having the highest OFDM symbol index among OFDM symbols on which the control channel can be transmitted. Alternatively, the meaning of assigning weight may mean that the greatest number of CCH candidates belonging to the search space are located on the first OFDM symbol among the OFDM symbols on which the control channel can be transmitted and a greater number of CCH candidates are located on an OFDM symbol having a low index than on an OFDM symbol having a high index among the OFDM symbols on which the control channel can be transmitted. It is possible to assign a high weight to the number of search spaces and the number of CCH candidates within each search space as an OFDM symbol index becomes lower. The present invention described hereinabove has proposed a scheme of configuring CCEs constituting one CCH on one symbol in configuring the search space of the UE. When BD of the UE is considered while this principle is maintained, a scheme of configuring the search space of the UE with respect to each OFDM symbol on which the control channel can be transmitted has been proposed. The search space of the UE may be defined as a function of an OFDM symbol index. As an OFDM symbol index increases, the number of search spaces, in other words, the number of search space candidates, may be reduced. This scheme may be differently applied according to a CCE aggregation level constituting the CCH. While the case in which a start timing of the search space of the UE is the same with respect to each aggregation level has been described, the start timing of the search space of the UE and a CCE index interval between search spaces may also be configured with respect to each aggregation level.

<Case in Which Different Numerologies are Multiplexed>

In the new RAT system, various usage scenarios (e.g., eMBB, mMTC, URLLC, etc.) are considered and therefore different key performance indexes (KPIs) should be satisfied. For example, eMBB should satisfy a high rate, mMTC should satisfy extended coverage and power saving, and URLLC should satisfy low latency. To support different coverage according to the KPIs and the scenarios, the new RAT system may use different numerologies within one system (or on a single carrier). Herein, the numerologies include a subcarrier spacing, the length of one symbol, the length of a subframe on the time axis, and the number of symbols per subframe in an OFDM system. When different numerologies are multiplexed in one system, these numerologies may be simply TDMed or frequency-division-multiplexed (FDMed). In consideration of complexity, it is desirable that these numerologies be FDMed except for a very urgent service. If different numerologies are used through FDM, the UE may enter a cell (or a specific carrier) through initial access and then move to each subband or carrier (within the cell/carrier) according to desired use case or service, thereby receiving the service. Even in this case, in order to receive a DL control channel, the UE should perform BD in a time-frequency region in which the corresponding channel is transmitted.

Figure 12:
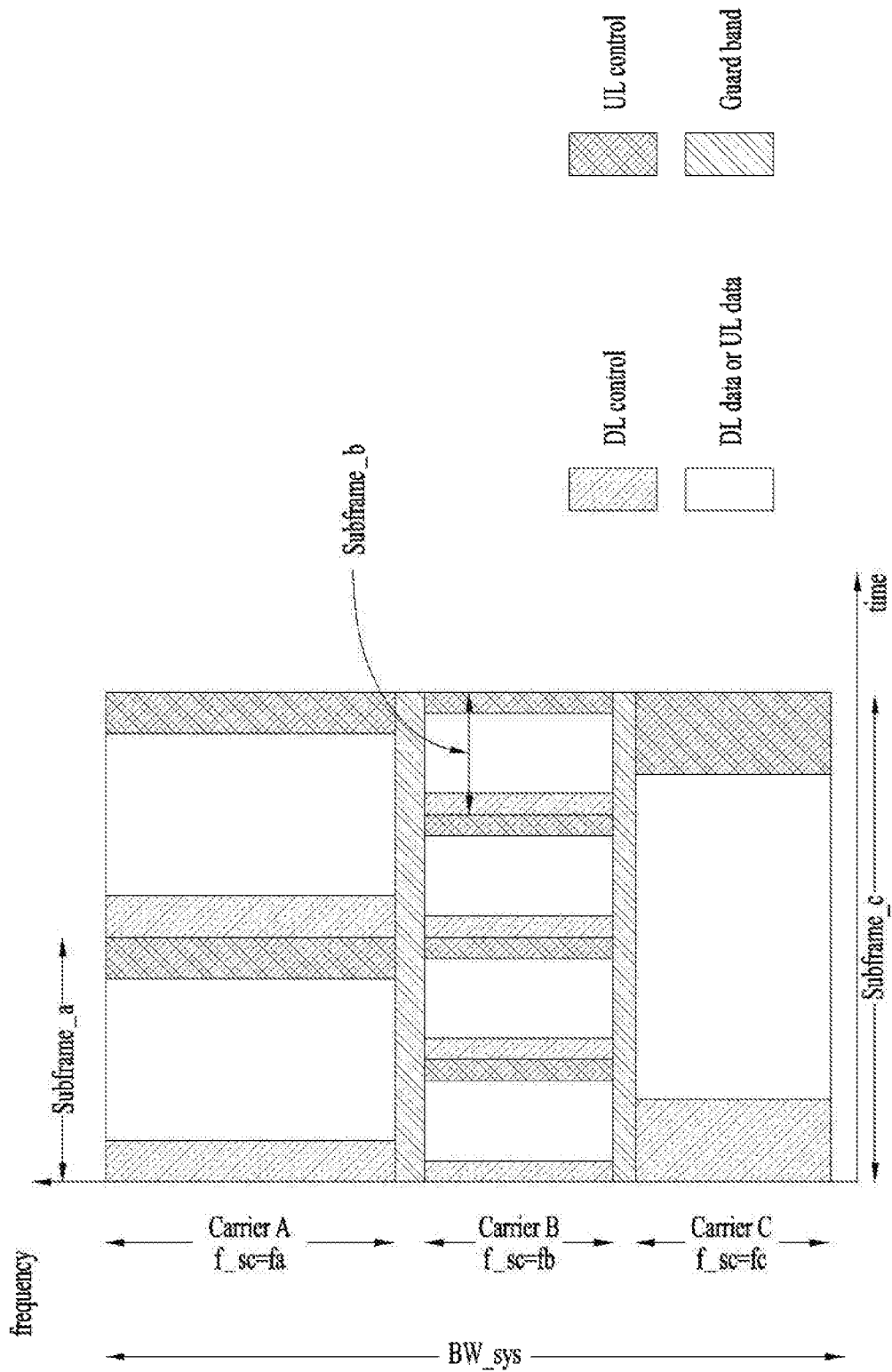
FIG. 12 illustrates a system in which different numerologies are multiplexed.

FIG. 12 illustrates a system in which different numerologies are multiplexed.

In FIG. 12, BW_sys denotes a system bandwidth and f_sc denotes a subcarrier spacing. In the legacy LTE system, each carrier corresponds to BW_sys. In FIG. 12, BW_sys may correspond to the sum of bandwidths of carriers supported by the system. For example, even if a center frequency differs, a bandwidth in which a synchronization signal having the same cell ID is transmitted may be BW_sys. In the legacy LTE system, an RB is indexed per carrier, whereas, in the present invention, RBs belonging to BW_sys may be indexed over carrier(s) (excluding RBs used as a guard region).

As illustrated in FIG. 12, the length of a subframe and the length of OFDM symbols constituting one subframe differ according to numerology, specifically, a subcarrier spacing in each subband or carrier (hereinafter, referred to as a carrier). For example, if the subcarrier spacing is 15 kHz, 30 kHz, and 60 kHz, the length of one symbol becomes 66.67 µs, 33.33 µs, and 16.67 µs, respectively. Assuming that the number of OFDM symbols constituting one subframe does not differ according to each subcarrier spacing, the length of one subframe is linearly inversely proportional to the size of the subcarrier spacing. For example, if the length of a subframe is 1 ms for the subcarrier spacing of 15 kHz, the length of a subframe is 0.5 ms for the subcarrier spacing of 30 kHz and the length of a subframe is 0.25 ms for the subcarrier spacing of 60 kHz.

Assuming that a DL control channel is transmitted in every subframe, the UE should perform BD in every subframe to receive the control channel. In the legacy LTE system, it has been assumed that the UE performs 44 BDs during one subframe to receive/decode the control channel so that the UE may receive DL data or transmit UL data in a subframe identical to or associated with the one subframe. However, when different numerologies are multiplexed, the UE cannot guarantee to perform the same number of BDs during each subframe with respect to all subframe lengths supported by a system. The number of BDs of the UE is associated with decoding or encoding capabilities of the UE and this is determined by absolute time. A subframe mentioned in the present invention may have the same meaning as an interval for performing scheduling (e.g., detection trial of a DL control channel) or a TTI. Accordingly, the number of BDs for receiving the control channel should differ according to the length of the subframe.

Since BD capabilities of the UE are associated with search space configuration for a control channel of the UE and control channel reception performance of the UE, accurate information should be exchanged between the UE and the eNB. Therefore, in the present invention, the UE reports BD capabilities thereof to the eNB. The UE may report the BD capabilities thereof according to any one of the following methods.

Method A: BD capabilities (e.g., the maximum number of BDs that can be performed by the UE during a corresponding time) are reported based on a subframe of the smallest unit or a subcarrier spacing corresponding thereto.

Method B: BD capabilities (e.g., the maximum number of BDs that can be performed by the UE during a corresponding time) are reported based on a subframe of the largest unit or a subcarrier spacing corresponding thereto.

Method C: BD capabilities (e.g., the maximum number of BDs that can be performed by the UE during a corresponding time) are reported based on a subframe used on an anchor carrier or a subcarrier spacing corresponding to the subframe when the anchor carrier, which is a carrier for initial access, is additionally present.

Method D: BD capabilities (e.g., the maximum number of BDs that can be performed by the UE during a corresponding time) are reported based on the length of each subframe or a subcarrier spacing corresponding thereto. BD capabilities are reported according to a subframe length supported by a system or a subframe length supportable by the UE.

In Method A, Method B, and Method C, the UE may simultaneously perform reporting about whether BD capabilities of the UE linearly increase or decrease according to subframe length. Alternatively, in Method A, Method B, and Method C, it may be assumed between the eNB and the UE that the BD capabilities of the UE linearly increase or decrease according to subframe length. Alternatively, BD capabilities of the UE reported according to a reference time and a reference subcarrier spacing, i.e., BD capabilities of the UE for subframes of different lengths according to the maximum number of BDs, may be assumed/predetermined between the eNB and the UE by a function predetermined between the eNB and the UE. If the BD capabilities do not linearly increase or decrease according to subframe length, it is desirable to report BD capabilities according to each subframe length as in Method D.

The search space for the control channel of the UE may be determined by a function of a radio network temporary identifier (RNTI) of the UE. Hereinafter, a method of allocating the RNTI of the UE according to each carrier will be proposed. The UE may perform a signal transmission/reception operation (e.g. search space configuration through RNTI based hashing, CRC check for a CCH, and an RNTI based scrambling/descrambling procedure for DL/UL data channel transmission/reception) on a corresponding carrier based on an independent (e.g., different) RNTI with respect to each carrier. The UE performs an initial access procedure through a specific carrier. Through the initial access procedure, the UE may obtain information about numerology for which a corresponding cell/eNB provides a service and information about a frequency location and service type of a carrier to which the numerology is applied. The UE may report BD capabilities thereof through the initial access procedure or an RACH procedure (i.e., random access procedure). The UE may receive the RNTI allocated thereto through the initial access procedure and the eNB may allocate a plurality of UE-specific RNTIs to the UE. The plural UE-specific RNTIs may be service-specific or use case-specific. That is, if a different service is supported on each carrier and different numerology is used on each carrier, the UE performs BD for the control channel using a UE-RNTI corresponding to the service and numerology. Basically, the UE receives one RNTI allocated thereto and preferentially receives one service. When an additional service is needed, the UE may request that the eNB allocate an RNTI corresponding to the service and the eNB may additionally allocate the RNTI at the request of the UE. When the UE simultaneously receives two services or desires to alternately receive two or multiple services at a relatively short period, the eNB does not release an already allocated RNTI. However, when the UE switches to another service during a relatively long time, the eNB releases the already allocated RNTI. The UE uses a newly allocated RNTI to switch to a carrier corresponding to the RNTI and receives the control channel according to numerology on the carrier.

Figure 13:
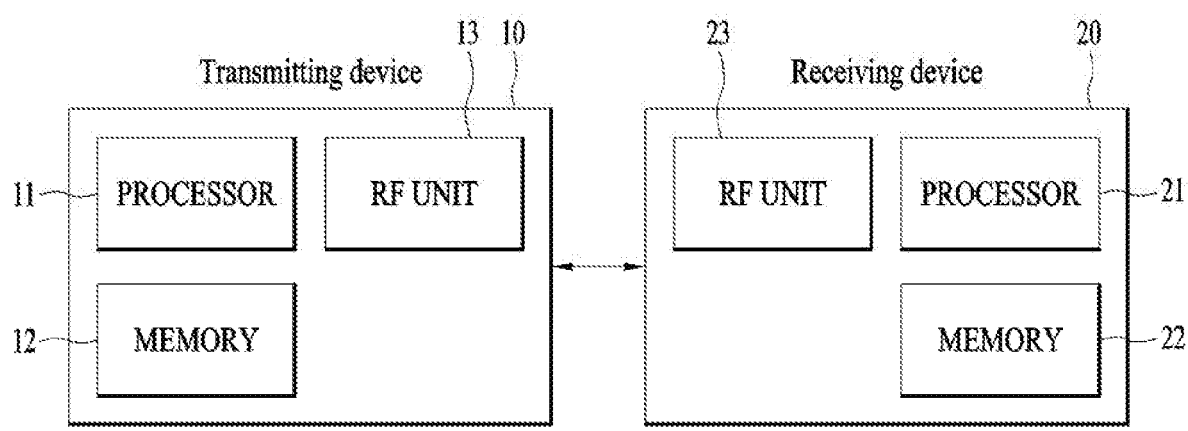
FIG. 13 is a block diagram illustrating elements of a transmitting device 10 and a receiving device 20 for implementing the present invention.

FIG. 13 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described examples of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the examples of the present invention, a UE operates as the transmitting device 10 in UL and as the receiving device 20 in DL. In the examples of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor may configure a search space, which is a set of a plurality of CCH candidates, and control the eNB RF unit to transmit a CCH in the search space. The search space may be configured by spanning one or more OFDM symbols. Each of the CCH candidates may consist of one of the plural OFDM symbols in the time domain and L CCEs (where L is a positive integer) in the frequency domain. The eNB processor may configure the search space to locate the greatest number of CCH candidates on the first OFDM symbols among the plural OFDM symbols. The eNB processor may configure the search space to locate a greater number of CCH candidates on an OFDM symbol having a low index than on an OFDM symbol having a high index. The eNB processor may configure the search space to configure each CCH candidate by CCEs included in one OFDM symbol. The eNB processor may control the eNB RF unit to transmit configuration information indicating the search space.

The UE processor may configure a search space, which is a set of a plurality of CCH candidates, and monitor a CCH in the search space. The UE processor may control the UE RF unit to receive the CCH from one of the plural CCH candidates. The search space may be configured by spanning one or more OFDM symbols. Each of the CCH candidates may consist of one of the plural OFDM symbols in the time domain and L CCEs (where L is a positive integer) in the frequency domain. The UE processor may configure the search space to locate the greatest number of CCH candidates on the first OFDM symbol among the plural OFDM symbols. The UE processor may configure the search space to locate a greater number of CCH candidates on an OFDM symbol having a low index than on an OFDM symbol having a high index. The UE processor may configure the search space to configure each CCH candidate by CCEs included in one OFDM symbol. The UE RF unit may receive configuration information indicating the search space and the UE processor may configure the search space based on the configure information.

As described above, the detailed description of the preferred examples of the present invention has been given to enable those skilled in the art to implement and practice the invention. Although the invention has been described with reference to examples, those skilled in the art will appreciate that various modifications and variations can be made in the present invention without departing from the spirit or scope of the invention described in the appended claims. Accordingly, the invention should not be limited to the specific examples described herein, but should be accorded the broadest scope consistent with the principles and novel features disclosed herein.

INDUSTRIAL APPLICABILITY

The examples of the present invention are applicable to a BS, a UE, or other devices in a wireless communication system.

The invention claimed is:

1. A method of receiving a downlink signal by a user equipment, the method comprising:
   detecting a control channel (CCH) from one of CCH candidates by monitoring the CCH candidates in a search space which is a set of the CCH candidates of an aggregation level L (where L is a positive integer) within a time transmission interval (TTI); and
   receiving downlink data based on downlink control information carried by the CCH,
   wherein the TTI includes a plurality of time symbols in a time domain,
   wherein the search space spans N time symbols (where N is a positive integer) among the plural time symbols,
   wherein each of the CCH candidates consists of one of the N time symbols in the time domain and L control channel elements (CCEs) in a frequency domain, and
   wherein the search space includes a greatest number of CCH candidates on a first time symbol of the N time symbols.

2. The method of claim 1, wherein the search space includes a greater number of CCH candidates on a time symbol having a low time symbol index than on a time symbol having a high time symbol index among the N time symbols.

3. The method of claim 1, further comprising:
   receiving configuration information on the search space.

4. The method of claim 1, wherein each of the CCH candidates in the search space consists of CCEs located in the same time symbol.

5. A user equipment for receiving a downlink signal, the user equipment comprising,
   a radio frequency (RF) module, and
   a processor configured to control the RF module,
   wherein the processor:
   detects a control channel (CCH) from one of CCH candidates by monitoring the CCH candidates in a search space which is a set of the CCH candidates of an aggregation level L (where L is a positive integer) within a time transmission interval (TTI); and
   controls the RF module to receive downlink data based on downlink control information carried by the CCH,
   wherein the TTI includes a plurality of time symbols in a time domain,
   wherein the search space spans N time symbols (where N is a positive integer) among the plural time symbols,
   wherein each of the CCH candidates consists of one of the N time symbols in the time domain and L control channel elements (CCEs) in a frequency domain, and
   wherein the search space includes a greatest number of CCH candidates on a first time symbol of the N time symbols.

6. The user equipment of claim 5, wherein the search space includes a greater number of CCH candidates on a time symbol having a low time symbol index than on a time symbol having a high time symbol index among the N time symbols.

7. The user equipment of claim 5, wherein the processor controls the RF module to receive configuration information on the search space.

8. The user equipment of claim 5, wherein each of the CCH candidates in the search space consists of CCEs located in the same time symbol.

9. A base station for transmitting a downlink signal, the base station comprising:
   a radio frequency (RF) module, and
   a processor configured to control the RF module,
   wherein the processor:
   controls the RF module to transmit a control channel (CCH) using one of CCH candidates in a search space which is a set of the CCH candidates of an aggregation level L (where L is a positive integer) within a time transmission interval (TTI); and
   controls the RF module to transmit downlink data based on downlink control information carried by the CCH,
   wherein the TTI includes a plurality of time symbols in a time domain,
   wherein the search space spans N time symbols (where N is a positive integer) among the plural time symbols,
   wherein each of the CCH candidates consists of one of the N time symbols in the time domain and L control channel elements (CCEs) in a frequency domain, and
   wherein the search space includes a greatest number of CCH candidates on a first time symbol of the N time symbols.

10. The base station of claim 9, wherein the search space includes a greater number of CCH candidates on a time symbol having a low time symbol index than on a time symbol having a high time symbol index among the N time symbols.

11. The base station of claim 9, wherein the processor controls the RF module to transmit configuration information on the search space.

12. The base station of claim 9, wherein each of the CCH candidates in the search space consists of CCEs located in the same time symbol.

* * * * *